United States Patent
Albrecht et al.

(10) Patent No.: US 9,959,476 B2
(45) Date of Patent: *May 1, 2018

(54) READING MACHINE WITH CAMERA POLARIZER LAYERS

(75) Inventors: Paul Albrecht, Bedford, MA (US); Raymond C. Kurzweil, Newton, MA (US); Lucy Gibson, Belmont, MA (US); Rafael Maya Zetune, Brighton, MA (US); Lev Lvovsky, Waban, MA (US)

(73) Assignee: KNFB READER, LLC, Baltimore, MD (US)

(*) Notice: Subject to any disclaimer, the term of this patent is extended or adjusted under 35 U.S.C. 154(b) by 1955 days.

This patent is subject to a terminal disclaimer.

(21) Appl. No.: 12/051,945

(22) Filed: Mar. 20, 2008

(65) Prior Publication Data

US 2009/0237660 A1 Sep. 24, 2009

(51) Int. Cl.
| | |
|---|---|
| *G02B 5/30* | (2006.01) |
| *G03B 15/03* | (2006.01) |
| *G06K 9/20* | (2006.01) |
| *G03B 17/12* | (2006.01) |
| *G03B 11/00* | (2006.01) |
| *G03B 17/56* | (2006.01) |

(52) U.S. Cl.
CPC ......... *G06K 9/2036* (2013.01); *G02B 5/3025* (2013.01); *G02B 5/3033* (2013.01); *G03B 11/00* (2013.01); *G03B 15/03* (2013.01); *G03B 17/12* (2013.01); *G03B 17/56* (2013.01); *G06K 9/209* (2013.01)

(58) Field of Classification Search
CPC .... G02B 5/3025; G02B 5/3033; G03B 11/00; G03B 17/12; G03B 15/03; G03B 17/56
USPC ........ 359/365, 465, 487.01, 487.02; 396/155
See application file for complete search history.

(56) References Cited

U.S. PATENT DOCUMENTS

| | | | | |
|---|---|---|---|---|
| 2,117,004 A | * | 5/1938 | Joachim | 356/73 |
| 2,169,688 A | * | 8/1939 | Frotschner | G03B 13/20 359/488.01 |
| 2,748,764 A | * | 6/1956 | Boyd et al. | 351/203 |
| 2,837,087 A | * | 6/1958 | Sawyer | 351/203 |
| 3,663,085 A | * | 5/1972 | Davis | 359/465 |
| 3,762,298 A | * | 10/1973 | Johnson | G03B 3/02 396/65 |
| 3,882,517 A | * | 5/1975 | Land | G03B 15/0426 359/892 |

(Continued)

OTHER PUBLICATIONS

U.S. Appl. No. 11/689,569, filed Mar. 22, 2007 entitled: "Reading Machine with Camera Polarizer Layers" by Lev Lvovsky et al.

*Primary Examiner* — Ricky D Shafer
(74) *Attorney, Agent, or Firm* — Whiteford, Taylor & Preston, LLP; Peter J. Davis

(57) ABSTRACT

A reading machine includes an image input device including a lens and a polarizer disposed over the lens, a flash and a second polarizer disposed over the flash. The image input device also includes a computing device coupled to the image input device for capturing images, the computing device, including a processor to execute instructions and a computer program product residing on a computer readable medium, the computer program product comprising instructions for causing the processor to process the captured images to recognize features in the captured images.

14 Claims, 17 Drawing Sheets

(56) References Cited

U.S. PATENT DOCUMENTS

| | | | |
|---|---|---|---|
| 4,431,265 A * | 2/1984 | Benton | 359/465 |
| 5,239,372 A * | 8/1993 | Lipton | 348/58 |
| 5,933,127 A * | 8/1999 | DuBois | 345/87 |
| 6,088,541 A | 7/2000 | Meyer | |
| 6,252,624 B1 * | 6/2001 | Yuasa et al. | 348/56 |
| 7,175,785 B2 | 2/2007 | Takeda et al. | |
| 7,729,607 B2 * | 6/2010 | Karim | 396/155 |
| 7,949,245 B2 * | 5/2011 | Lvovsky et al. | 396/155 |
| 2003/0017856 A1 * | 1/2003 | Kotchick | G02F 1/133528 455/566 |
| 2003/0103261 A1 * | 6/2003 | Hay | 359/352 |
| 2006/0152576 A1 * | 7/2006 | Kiessling | H04M 1/0256 348/14.01 |

* cited by examiner

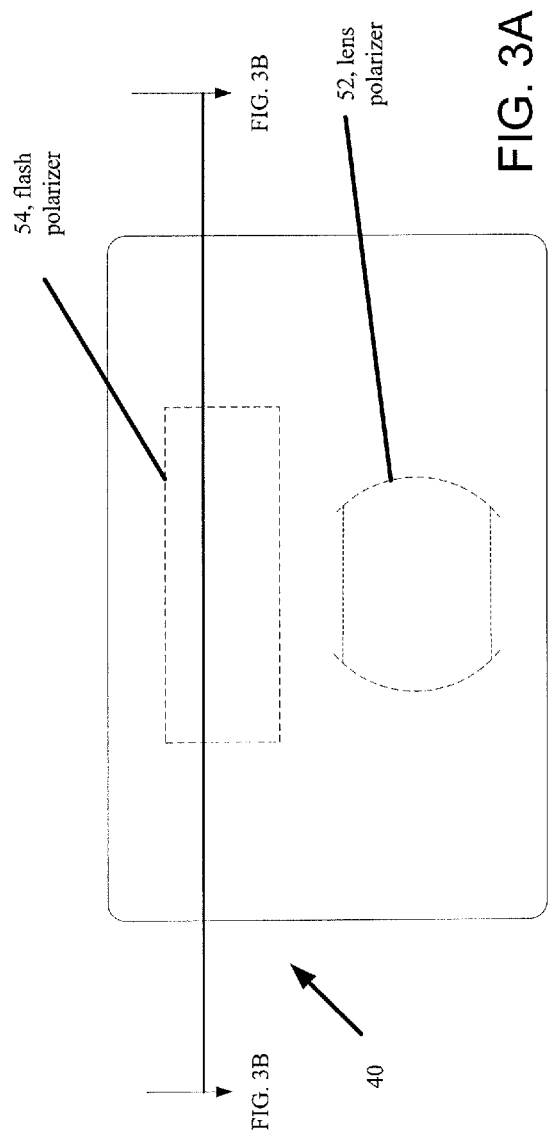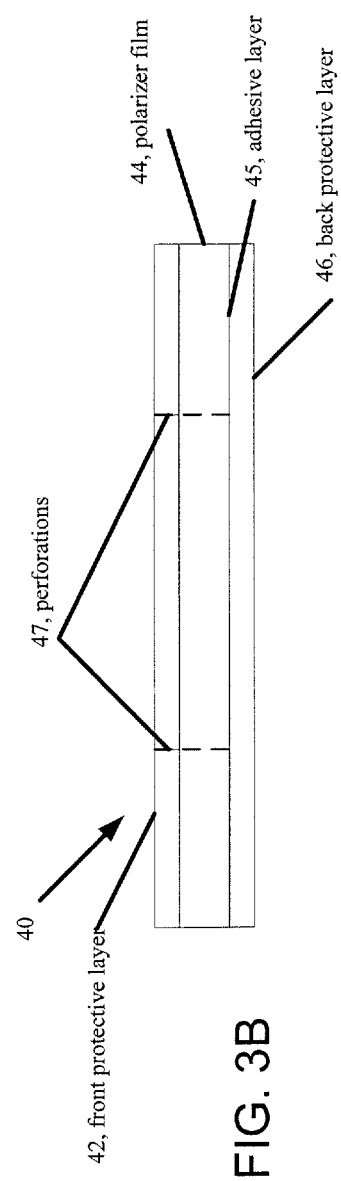

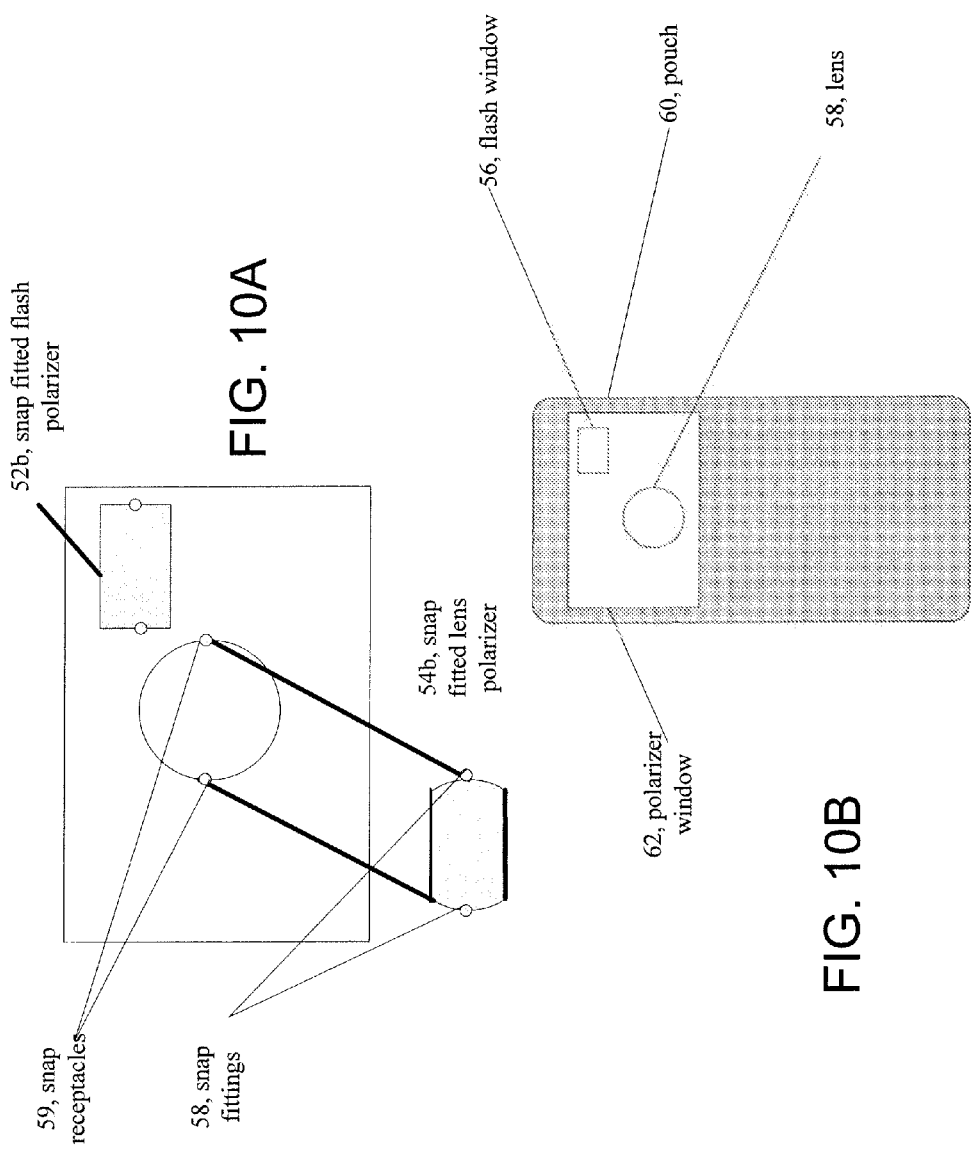

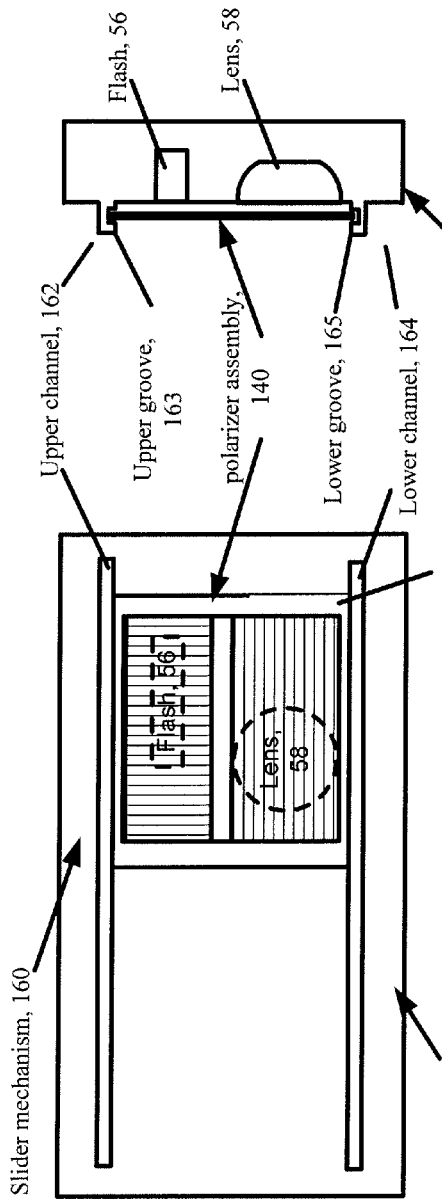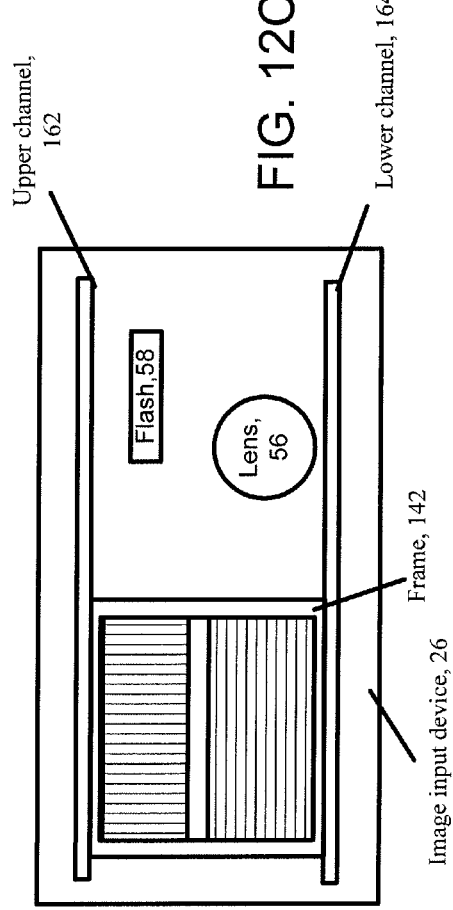

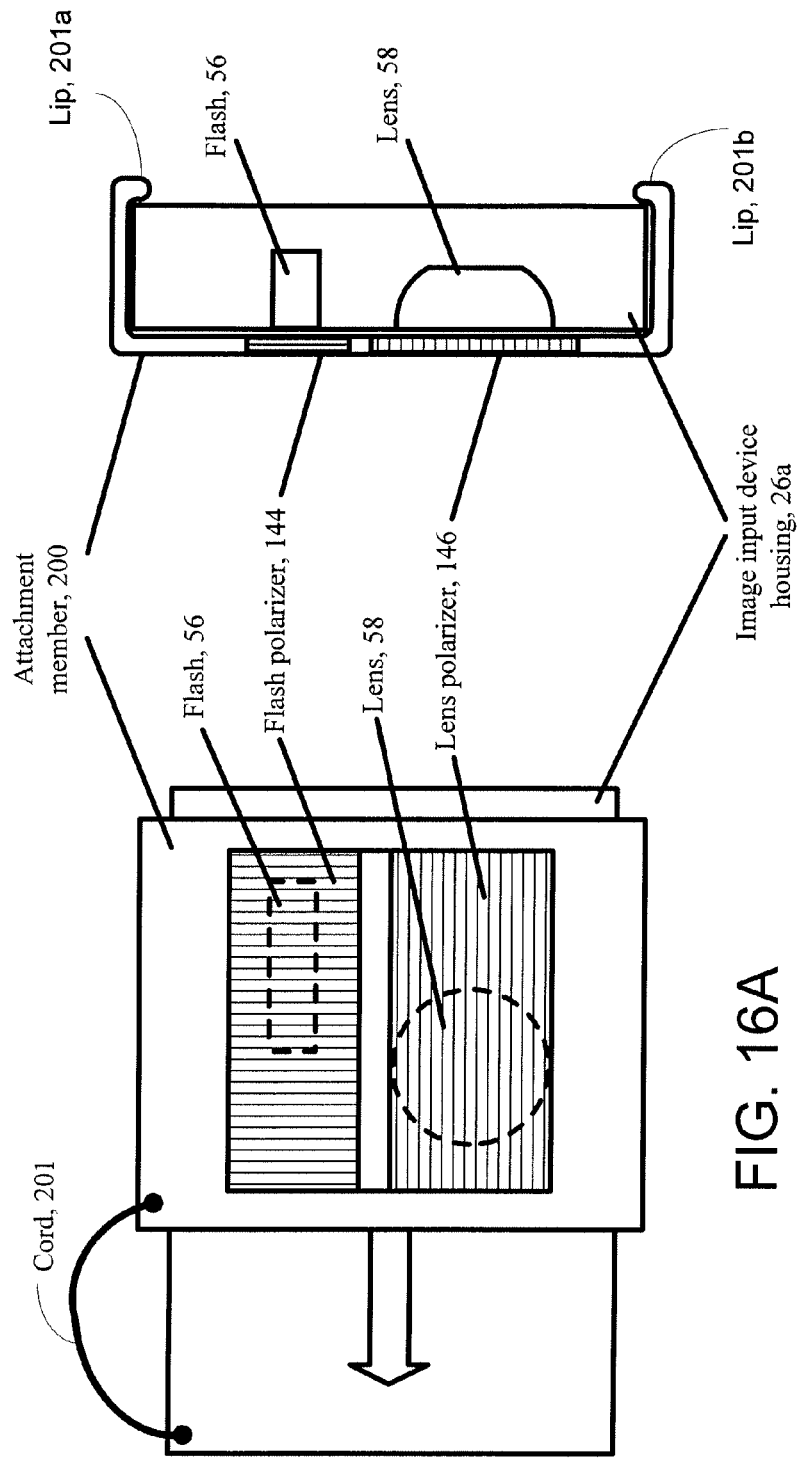

READING MACHINE WITH CAMERA POLARIZER LAYERS

BACKGROUND

Reading machines use optical character recognition (OCR) and text-to-speech (TTS) i.e., speech synthesis software to read aloud and thus convey printed matter to visually and developmentally impaired individuals. Reading machines read text from books, journals, and so forth.

Reading machines can use commercial off-the-shelf flat-bed scanners, a personal computer and optical character recognition (OCR) software. The computer processes an image with the OCR software and produces a text file. The text file is fed to text-to-speech synthesis software to provide electrical signals that are fed to audio output devices to render speech and thus read any recognized text aloud to the user.

One manner in which a reading machine can capture an image is through an imaging device that is attached to the reading machine. One such use is to capture images of a scene to convey content of the scene to a user. A scene can represent contents of an image that is being read. A scene can be a memo or a page of a book, or it can be a door in a hallway of an office building. The type of real-world contexts to "read" may include visual elements that are words, symbols or pictures, colors and so forth.

In addition to processing the image to recognize text, other recognition processes can include object recognition, such as recognizing faces, expressions on faces and so forth.

SUMMARY

In applications of reading machines with use of a flash to increase the light available to capture the image, there can be glare from glossy surfaces of a document or from, e.g., eyeglasses for facial recognition when a flash is used. Also there may be natural glare under strong lighting conditions all of which can interfere with recognition processing.

According to an aspect of the present invention, an image input device includes an image input device includes a lens, a flash window and a polarizer assembly having a pair of polarizers, the polarizer assembly disposed over the image input device, with one of the pair of polarizers covering the lens having a linear polarization that is orthogonal to a linear polarization of the other polarizer of the pair that covers the lens.

The following are embodiments within the scope of the invention.

The image input device is a camera. The polarizer assembly includes a frame member holding the polarizers. The device is a reading machine with the reading machine including a computing device coupled to the image input device for capturing images, the computing device, including a processor to execute instructions and a computer program product residing on a computer readable medium. The computer program product includes instructions for causing the processor to process the captured images to recognize features in the captured images. The computer program product further includes instructions to recognize text in the captured images and produce text and convert the recognized text to speech using text-to-speech software.

The polarizer assembly includes a frame comprised of a material that is stiffer that the material of the polarizers, with one of the polarizers disposed in a first portion of the frame that is aligned to the lens and the other one of the polarizers disposed in a second portion of the frame that is aligned with the flash window of the image input device. The device includes a pair of opposing channel members that are disposed on a face of the image input device, the pair of opposing channel members configured to accept the polarizer assembly. The pair of opposing channel members each have a groove that accepts one of a pair of opposing edges of the polarizer assembly. The pair of opposing channel members are each arranged and configured to allow the polarizer assembly to be disposed over the flash and lens of the image input device in a first orientation and to be retracted from image input device in a second, different orientation.

The device includes a case having a window portion, with the case accepting the polarizer assembly in the window portion of the case. The case has pair of opposing grooves adjacent the window portion to accept a pair of opposing edges of the polarizer assembly. The case has a hinged member affixed to a face of the case, with the polarizer assembly affixed to the hinge member to permit the polarizer assembly to be moved over and away from the flash and lens of the image input device. The case has a hinged member affixed to a face of case, with the polarizer assembly being an integral part of the hinge member to permit the polarizer assembly to be moved over and away from the flash and lens of the image input device.

According to another aspect of the present invention, a polarizer assembly includes a frame member and a pair of polarizer elements secured by the frame, with one of the polarizer elements having a linear polarization that is orthogonal to a linear polarization of the other of the polarizer elements.

The following are embodiments within the scope of the invention.

The frame member has a pair of regions that are configured to hold the polarizers. The frame is comprised of a stiff material relative to the stiffness of the polarizers. The frame includes an accommodation to attach the frame to a housing of an image input device. The accommodation is a protrusion. The accommodation is an indentation for a mating with a protrusion on the image input device. The frame includes a member that has a generally C-shaped cross-section that is configured to slide over the body of an image input device to position the pair of polarizer elements to cover a flash and lens portion of the image input device. The edges of the frame have a lip portion configured to secure the assembly to the image input device.

According to another aspect of the present invention, a case for an image input device includes a body portion of the case configured to house an image input device, the body portion having a window; and an accommodation for accepting in the window a polarizer assembly.

The following are embodiments within the scope of the invention.

The accommodation in the window portion of the case is a pair of opposing grooves that are disposed to accept a polarizer assembly into the window of the case. The polarizer assembly is affixed to the window of the case.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 3A and 3B are diagrams depicting a polarizer kit.

FIGS. 10A and 10B show alternative attachment techniques for the polarizers.

FIGS. 12A-12C are diagrams depicting the polarizer assembly on an image input device.

FIGS. 16A-16B are diagrams depicting an alternative arrangement for the polarizer assembly.

DETAILED DESCRIPTION

Figure 1:
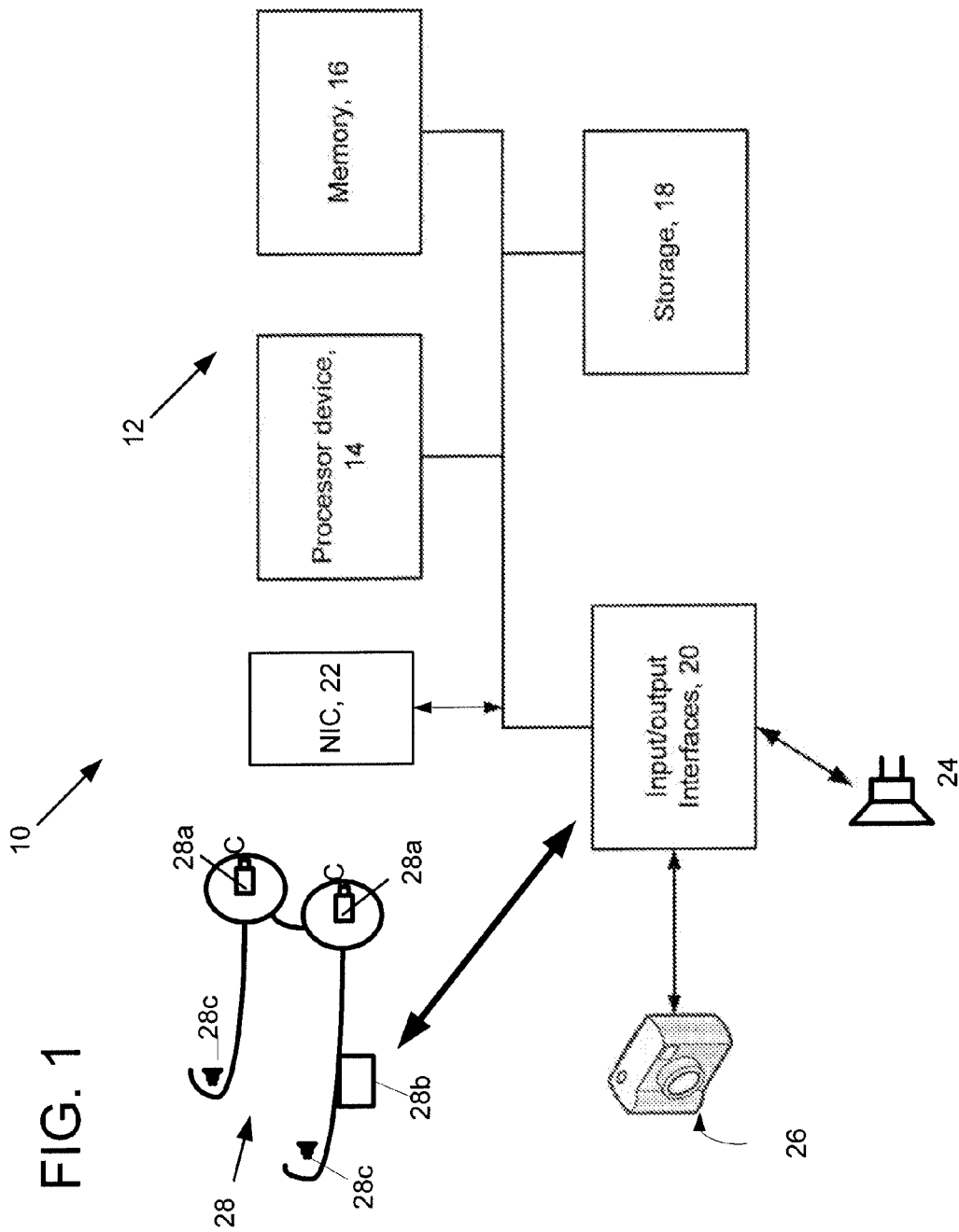
FIG. 1 is a block diagram of a portable reading machine with attached, portable imaging device.

Referring to FIG. 1 a configuration of a portable reading machine 10 is shown. The portable reading machine 10 includes a portable computing device 12 and image input device 26, as shown. The image input device 26 can be integrated into the reading machine 10. Alternatively, the portable reading machine 10 can be a camera with enhanced computing capability (that implements the functions of the portable computing device 12). The portable reading machine 10 can also be implemented as a mobile telephone, e.g., so-called smart phones such as the Nokia N95 (Nokia, Inc.) having an image input device and enhanced computing resources. Such a smart phone can be modified to have the computing resources execute application software that implements reading machine functionality (discussed below).

The image input device, e.g. a still camera, a video camera, portable scanner, etc, built-in camera on a cell phone, collects image data that is processed by portable computing device 12. The portable reading machine 10 has the image input device 26 coupled to the computing device 12 using a cable (e.g. USB, Firewire) or by wireless technology (e.g. Wi-Fi, Bluetooth, wireless USB) and so forth. An example is a consumer digital camera coupled to a pocket PC or a handheld Windows or Linux PC, a personal digital assistant and so forth which executes applications to implement reading machine functionality.

In general, as in FIG. 1, the portable computing device 12 of the portable reading machine 10 includes at least one processor device 14, memory 16 for executing computer programs and persistent storage 18, e.g., magnetic or optical storage, PROM, flash PROM or ROM and so forth that persistently stores computer programs and other data used by the reading machine 10. In addition, the portable reading machine 10 includes input and output interfaces 20 to interface the processing device to the outside world, such as to the image input device and user controls.

The portable reading machine 10 can include a network interface device (NIC) 22 to interface the reading machine to a network (including the Internet), e.g., to upload programs and/or data used in the reading machine 10. As a mobile phone, the phone can connect to the Internet, via the wireless carrier or to a local network via WiFI and Bluetooth. The network connectivity is useful for cooperative processing, in which the mobile device captures an image pre-processes the image to produce smaller bitmaps that could be sent to a more powerful computer for recognition processing. The recognized text (or object) information could be sent back to the mobile device.

The portable reading machine 10 includes an audio output device 24 to convey synthesized speech to the user from operation of the reading machine 10. The camera and audio devices can be coupled to the computing device using a cable (e.g. USB, Firewire) or using wireless technology (e.g. Wi-Fi, Bluetooth) etc. The portable reading machine 10 may have two cameras, or video input devices 26, one for high resolution and the other for lower resolution images. The lower resolution camera may be support lower resolution scanning for capturing gestures or directed reading, whereas the higher resolution one can be used to capture images that are process to recognize text and which text is used to synthesize speech.

The portable reading machine can be used with a pair of "eyeglasses" 28. The eyeglasses 28 may be integrated with one or more cameras 28a and coupled to the portable reading machine, via a communications link. The eyeglasses 28 provide flexibility to the user. The communications link 28b between the eyeglasses 28 and the portable reading machine can be wireless or via a cable, as discussed above. The eyeglasses 28 can have integrated speakers or earphones 28c to allow the user to hear the audio output of the portable reading machine.

Figure 2:
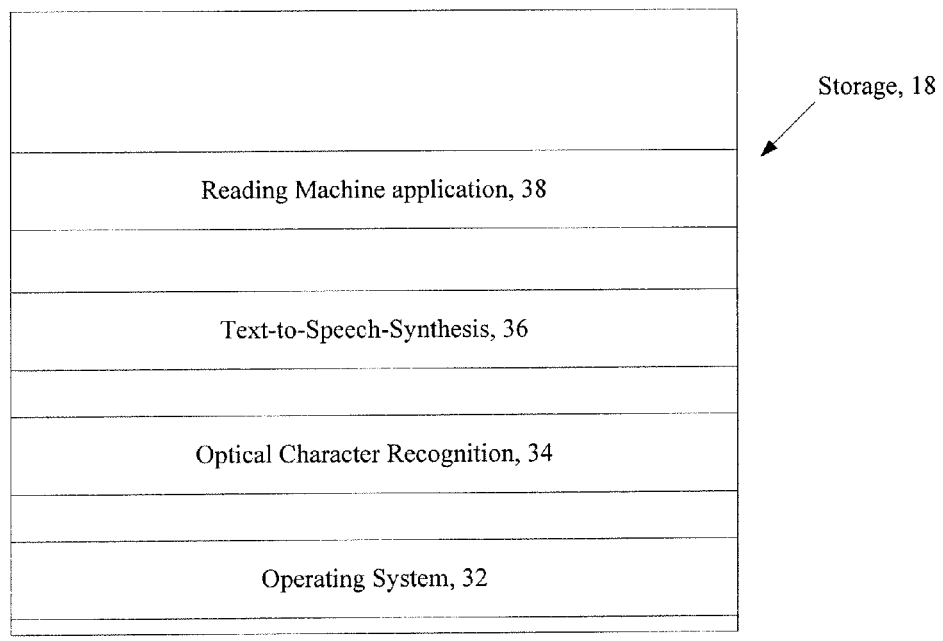
FIG. 2 is a block diagram.

Referring now to FIG. 2, elementary functions executed on the reading machine 10 are shown. Residing in storage 18 and executed in memory 16 under control of the processor 14 are an operating system 32, optical character recognition software 34 (or object recognition software), text-to-speech synthesis software 36 and a reading machine application 38 that accesses these software modules. The reading machine application 38 may include other more advanced functions and operate under different modes of operation as desired.

Referring now to FIG. 3, a polarizer kit 40 is shown. The polarizer kit is configured to be operable with the image input devices, especially if those devices are used, where varying lighting conditions can cause glare and other optical interference that can diminish the quality of the image and thus the effectiveness of OCR operation. For example, when the flash is used to image paper, often the paper has a glossy enough surface to produce glare that obliterates text. Magazines in particular have a very large amount of glare. The polarizers when installed on the image input device can improve performance in reading documents with a glossy finish. While the reader machine may continue to function normally without the polarizers, the reading quality may be sacrificed for glossy documents. While a user can tilt the camera at a slight angle from the text, to reduce the effects of glare, however this tilt would tend to also diminish the effectiveness of recognition processing, thus making it desirable to use the polarizers.

The polarizer kit includes a sheet of polarizer film 44, having a front protective layer 42 and a back protective layer 46. The protective layers 42, 46 are intended to be removed after installation. That is, the back protective layer is intended to be removed to allow the polarizer to be affixed to the device, whereas, the front protective layer 42 is intended to be removed before the first use of the imaging device. The back protective layer 46 protects an adhesive layer or surface 45 that is provided on the back surface of the polarizer film 44 and which back surface attaches to a lens or a flash window of the video input device 12, as will be discussed below. It is to be understood that the sheet of polarizer film 44 as well as the front protective layer 42 and the back protective layer 46 are relatively thin e.g., in a range of, e.g., 0.006" to 0.03" with 0.01" being a typical thickness, other thicknesses possible. The thicknesses are exaggerated in FIG. 2 for clarity in illustration. The protective layer's thickness is 0.003" other thicknesses are possible.

One such polarizer film is a linear polarizing Polyvinyl Alcohol-Iodine filter that polarizes in the visible light spectrum. The visible light transmission is 42% with an extinction transmittance of 1.7%. Optical density is measured using a beam of 100% linearly polarized light. Polarizers are available in 19"×50"×0.010" sheets obtained from American Polarizers, Inc. 141 South Seventh Street Reading, Pa. 19602 USA.

One example of an adhesive is a water-based acrylic pressure sensitive type adhesive. Such adhesives are high performance screen printable adhesives for instrument panels, touch panels, or appliqués that can be selectively applied and provide substantially, permanent adhesion and high peel strength properties for the particular application. One such example is "NFi Printed Adhesive," a water based acrylic pressure sensitive adhesive obtained from Nameplates For Industry, Inc. 213 Theodore Rice Blvd., New Bedford, Mass. 02745. Other adhesives and adhesive types can be used, provided that they are substantially transparent to optical wavelengths of interest, compatible with the polarizer and the material of the lens and flash window.

Also disposed in the polarizer kit 40 are perforations 47 that define a flash polarizer 52 and lens polarizer 54 elements and permit the flash polarizer 52 and the lens polarizer 54 to be released from the protective layer 46.

The polarizers 52 and 54 converts incident un-polarized or mixed-polarization beam of electromagnetic waves (e.g., light) into an output beam with a single polarization state (e.g., a single linear polarization). The polarizer layer 44 can be comprised of a Polaroid™ film that is made from polyvinyl alcohol (PVA) plastic with an iodine doping. Stretching of the sheet during manufacture aligns the PVA chains in one particular direction. Electrons supplied by the iodine dopant are able to travel along the chains, ensuring that light polarized parallel to the chains is absorbed by the sheet; whereas light polarized perpendicularly to the chains is transmitted.

Thus, since each of the flash polarizer 52 and the lens polarizer 54 have a particular orientation it is important that the flash polarizer 52 and the lens polarizer 54 are applied in a manner that that the polarizers have a polarization that are perpendicular to each other.

Figure 4:
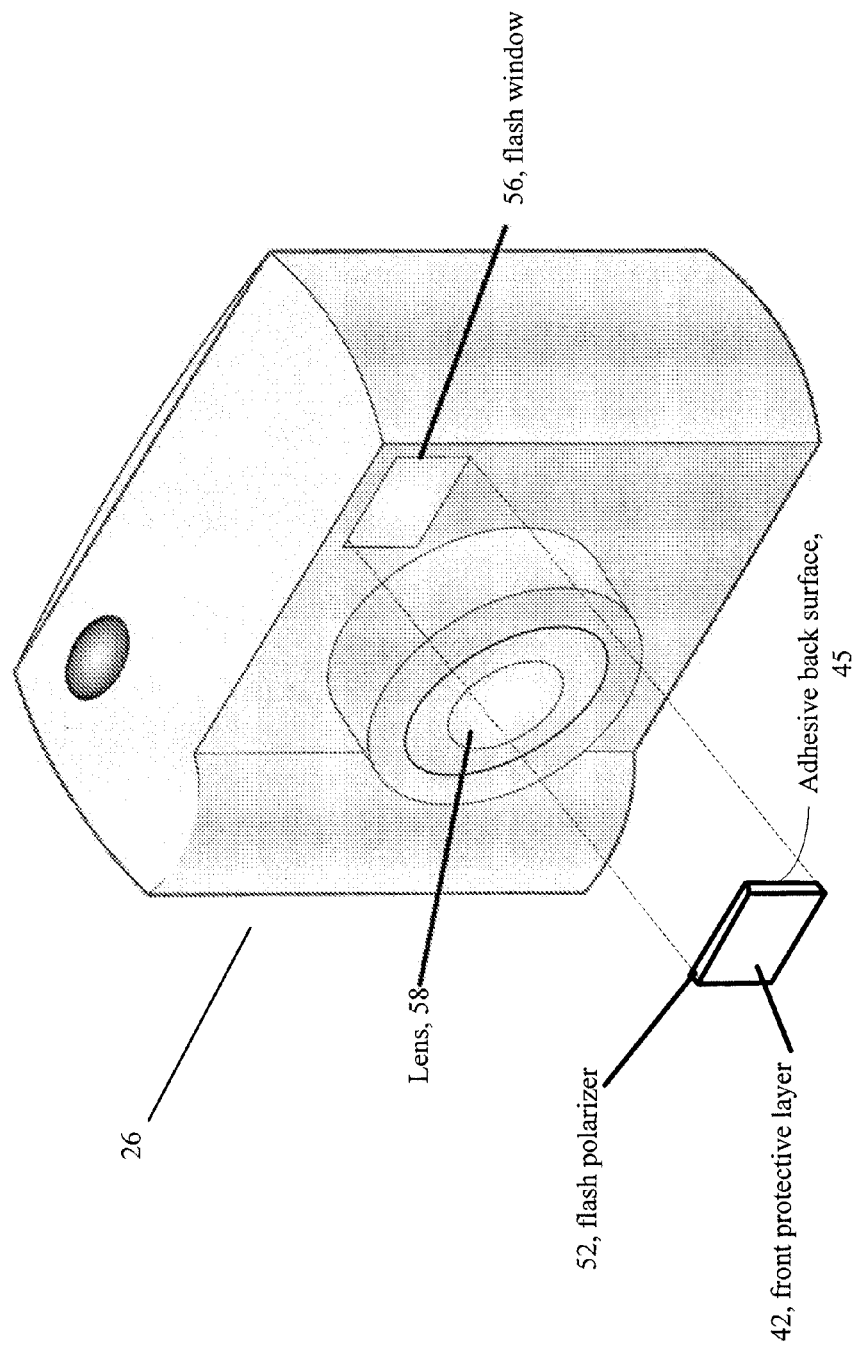
FIGS. 4-6 are diagrams depicting an image input device with polarizers.
Figure 5:
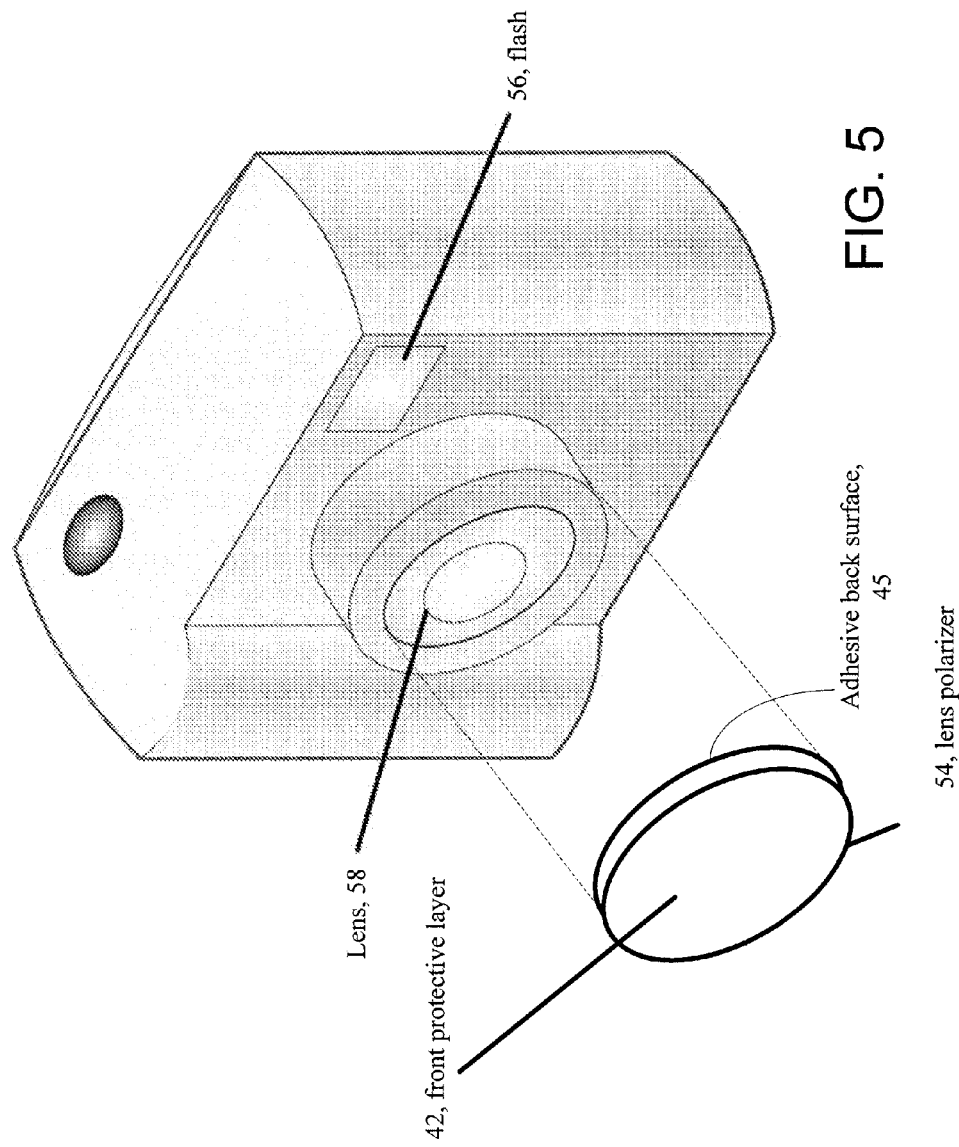
Figure 6:
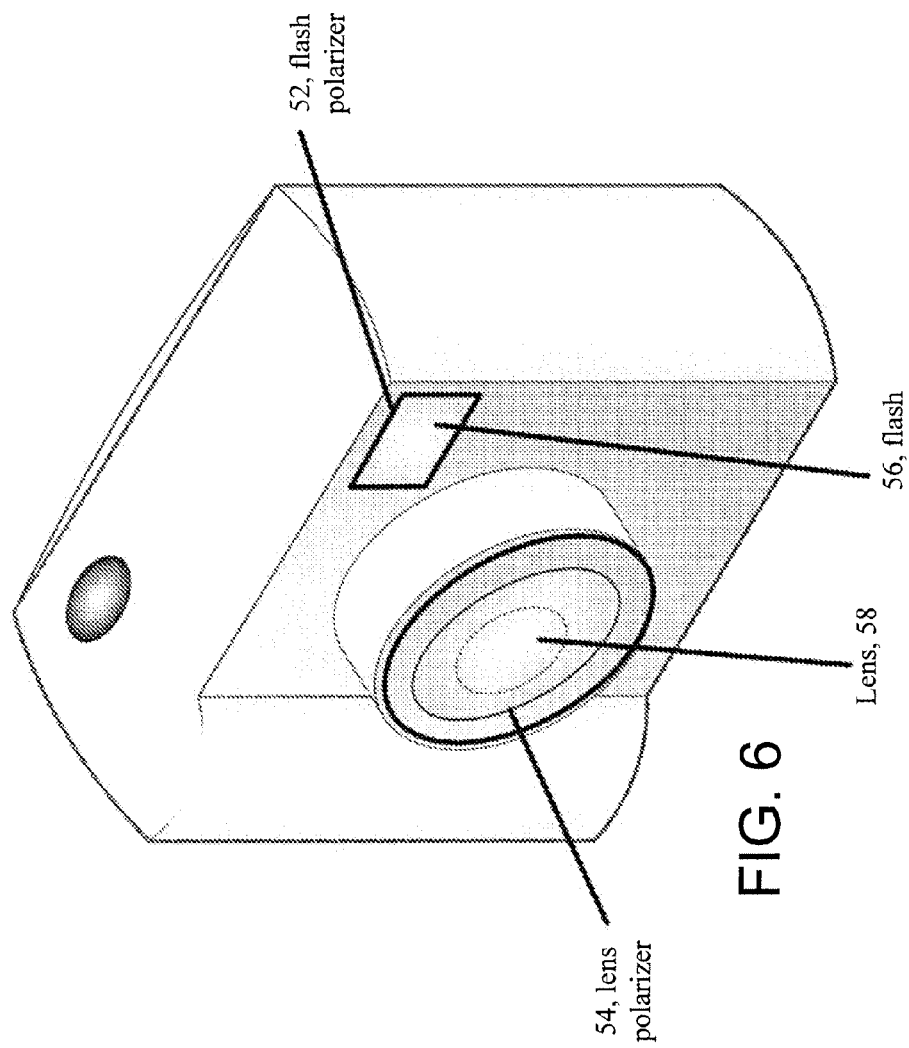

Referring now to FIGS. 4-6, steps in the process of applying the flash polarizer 52 and the lens polarizer 54 to the flash 56 and lens 58 of the image input device 26 are illustrated. Since misalignment of the polarizers can degrade text recognition, it is desirable that the polarizers are installed by a sighted person or that the polarizers are manufactured on the device in order to avoid misalignment.

In FIG. 4, the flash polarizer 52 is applied over flash window 56 and the front protective layer 42 on the flash polarizer 52 is subsequently removed. In FIG. 5, the lens polarizer 54 is applied over the lens 58 and the front protective layer 42 on the lens polarizer 54 is subsequently removed. Care is taken when removing the front protective layer 42 from both the flash polarizer 52 and the lens polarizer 54 so as not to detach the flash polarizer 52 and the lens polarizer 54 from the flash 56 and lens 58, respectively.

Figure 7:
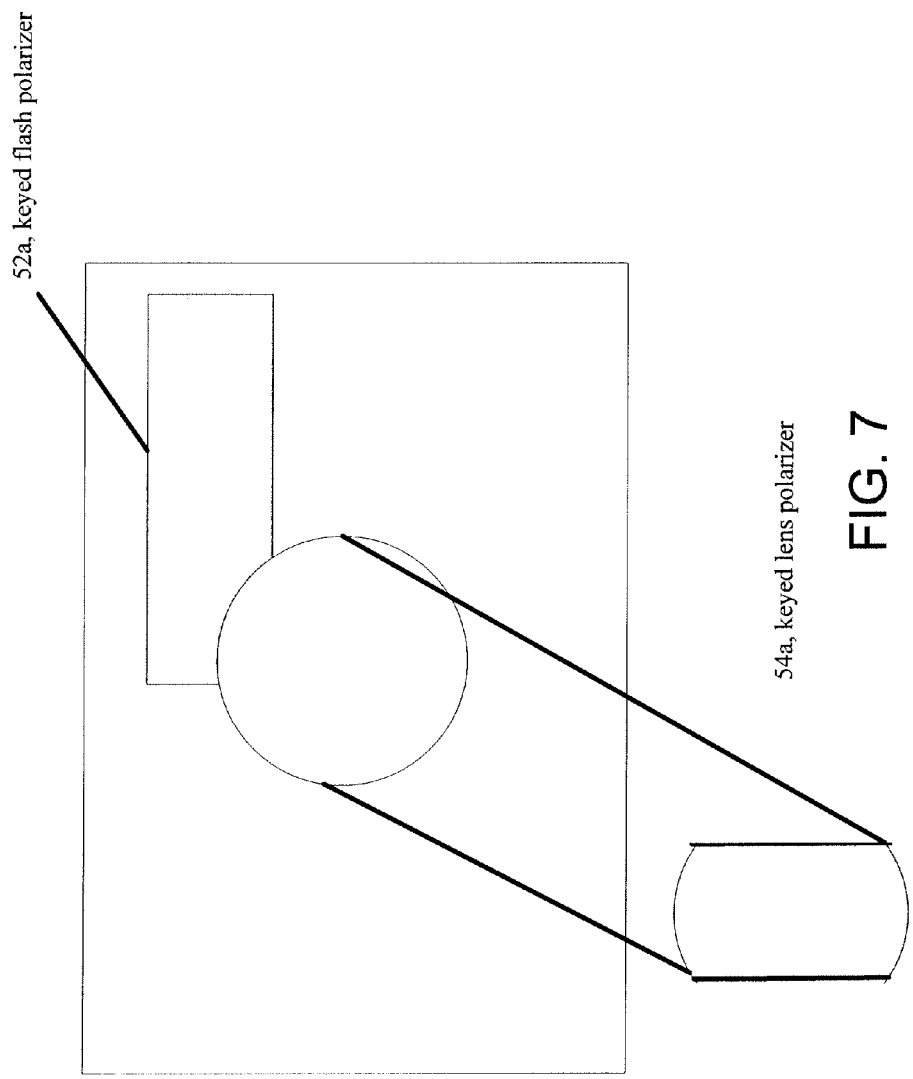
FIG. 7 is a diagram depicting an image input device with keyed polarizers.

As an aid to assist users in applying the flash polarizer 52 and the lens polarizer 54 to an image input device, keyed polarizers, such as a keyed flash polarizer 52a and a keyed lens polarizer 54a are provided. The keyed flash polarizer 52a and the keyed lens polarizer 54a are each provided with a perimeter that conforms at least a portion of the perimeter of the flash polarizer 52a and the keyed lens polarizer 54a to corresponding portions of the lens and flash window of the image input device. In other words, to assist in application of the polarizers to the lens and flash, the polarizers are customized in size and shape for particular models of such image input devices. For instance, as shown in FIG. 7, the keyed flash polarizer 52a has a shape that allows a portion of the perimeter of the keyed flash polarizer 52a to follow a contour of the housing for the lens. Similarly, the keyed lens polarizer 54a has truncated upper and lower edges of the perimeter that could be used to assist the user in applying the keyed lens polarizer 54a to the lens such that those edges are parallel to a reference on the image input device, and so forth.

Figure 8:
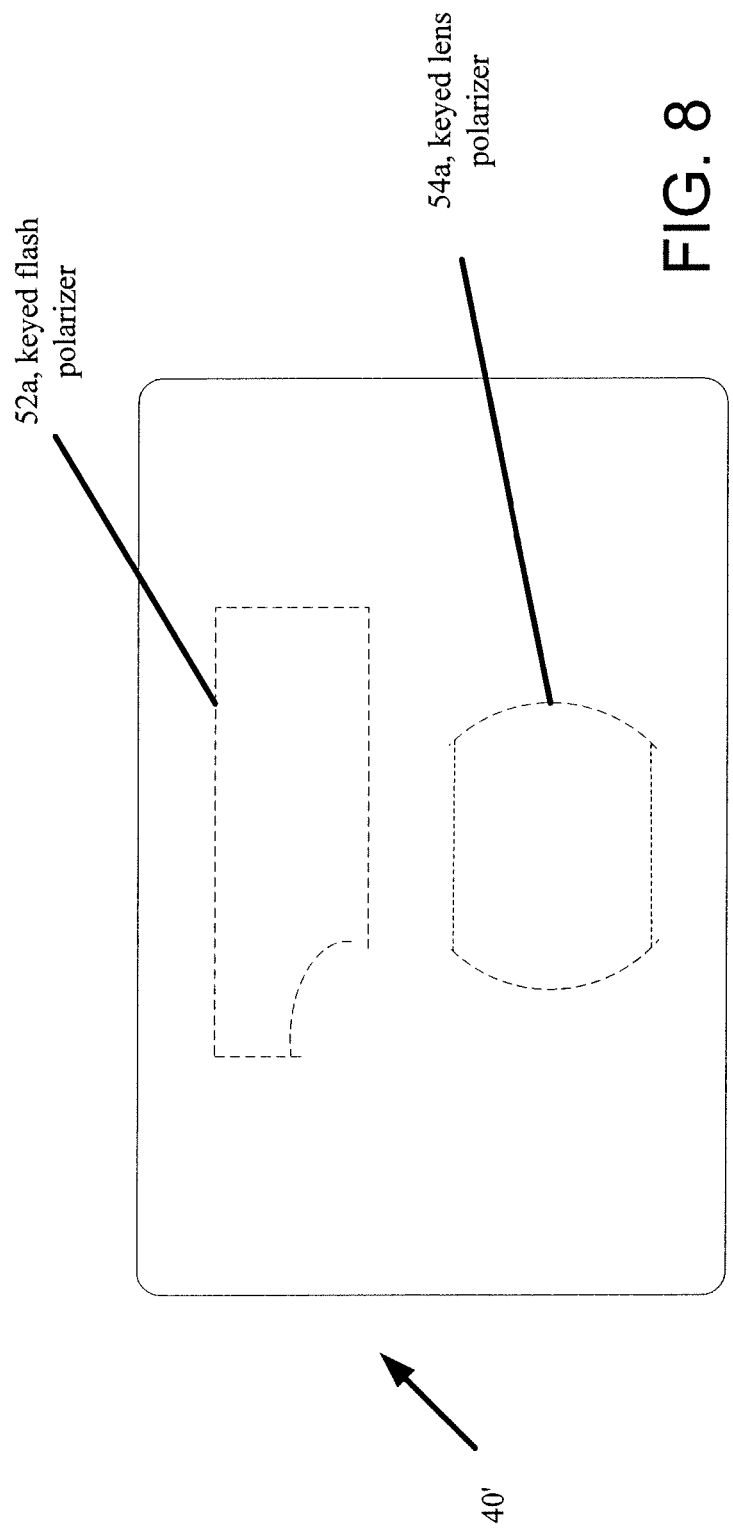
FIG. 8 is a plan view of an alternative polarizer kit.

A corresponding kit 40' is shown in FIG. 8 with the keyed flash polarizer 52a and the keyed lens polarizer 54a. The user would rotate the lens polarizer 90° relative to the flash window polarizer before applying the lens polarizer to the lens.

Figure 9:
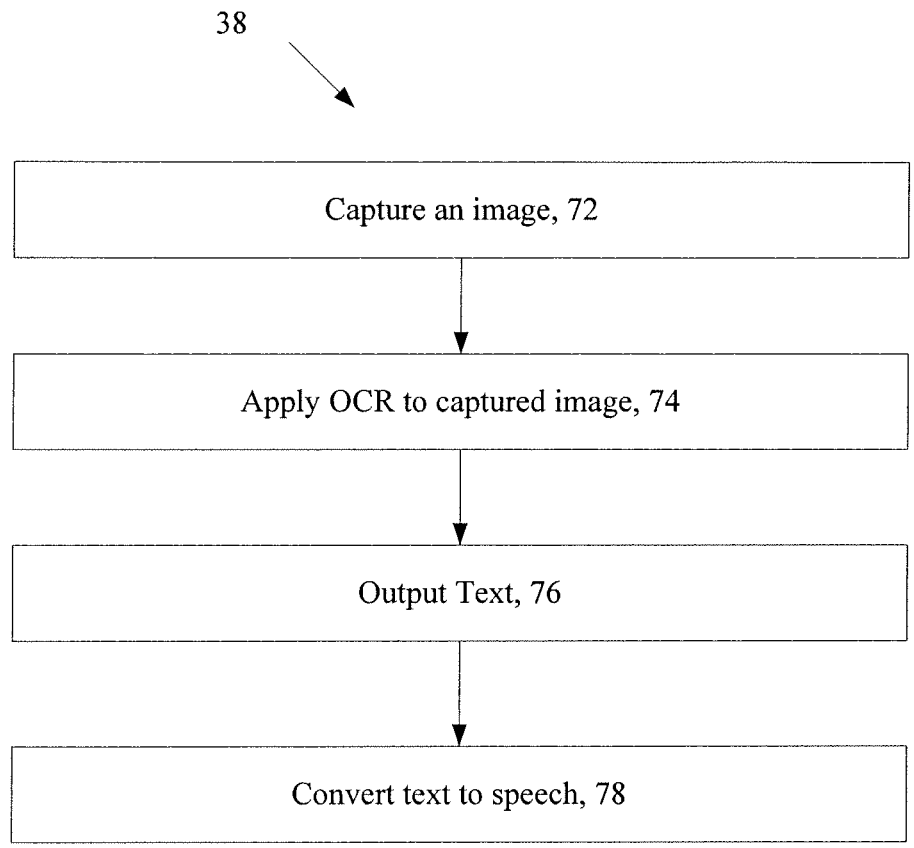
FIG. 9 is a flow chart.

Referring to FIG. 9, operation of the reading machine 10 is shown. In one mode of operation, the reading machine application 38 in conjunction with the image input device 26 causes the reading machine 10 to capture 72 an image of a scene, e.g., document, outdoor environment, device, etc. The reading machine application 38 processes the image in the computing system 12. Part of the processing of the image includes optical character recognition (OCR) processing 74 on the image. Processing of the image, results in an output 76 of text, e.g., as a text file or data structure. The text file or data structure is processed 78 by a text-to-speech application that converts the text to electrical signals that are rendered as speech.

The polarizers once installed on the image input device with the protective layer removed, should be protected from scratches, dirt, and direct sunlight. Intense heat may affect the polarizer's adhesion to the lens or flash window. The polarizers should not be touched with fingers or any cutting material or come in contact with dirty surfaces. Ideally, the image input device is stored in a pouch with the reader to protect the surfaces.

The polarizers may be cleaned using a soft piece of fabric, such as the type of fabric used to clean regular glasses.

The polarizers for the camera flash output may require a replacement after approximately one year of use. The need for a replacement is indicated when the quality of the text recognition appears to be decreasing. Misalignment of the polarizers can also degrade text recognition.

Other arrangements are possible. For instance polarizers 52b, 54b can be provided as individual units with fittings 58 which clip into receptacles 59 provided in the image input device 12, as shown in FIG. 10A. For instance, the polarizers 52b, 54b can be carried by a plastic frame that has protrusions 58 that snap into receptacles 59 adjacent the flash and lens on an image input device.

As shown in FIG. 10B, a pouch assembly 60 that is used to carry the image input device can be have regions 62 that are comprised of the polarization film at the proper orientation over the flash 56 and over the lens 58, when the image input device is fitted into the pouch 60. In this example, the polarizing window 62 has been manufactured such that the portion of the polarizing window that is over the lens 58 is in an orthogonal linear polarization with regard to the portion of the polarizer 62 that is over the flash window 56.

Figure 11A:
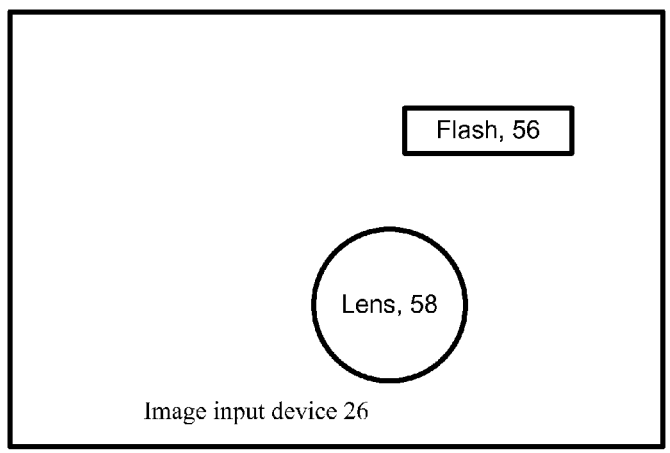
FIGS. 11A-11C are diagrams depicting an image input device and polarizer assembly.
Figure 11B:
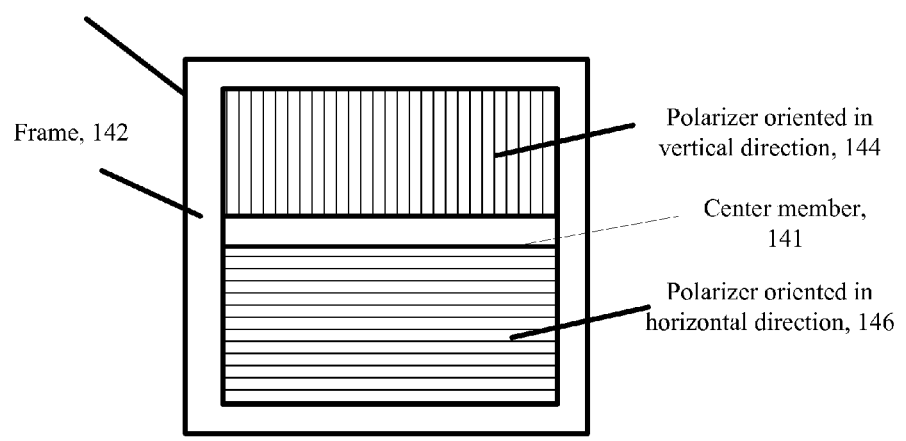
Figure 11C:
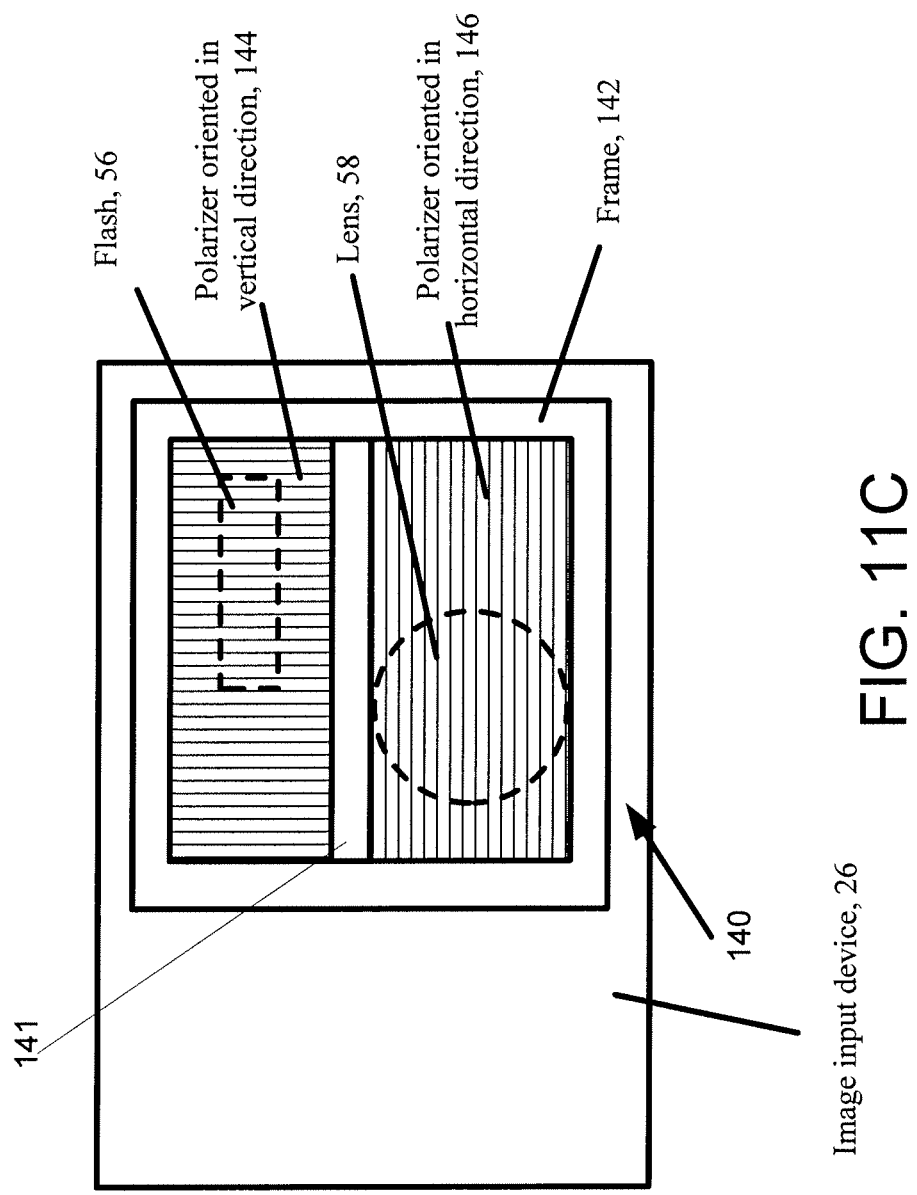

Referring now to FIGS. 11A-11C, a polarizer assembly 140 (FIG. 11B) for an image input device 26 is shown. The image input device, such as a camera 26 has a lens 58 and flash 56 (FIG. 4). Various ways of removably applying polarizer elements to the lens 58 and flash 56 are described. The polarizer assembly 140 is configured to be operable with the image input devices, e.g., 26 especially if those devices are used where varying lighting conditions can cause glare and other optical interference that can diminish the quality of the image and thus the effectiveness of OCR operation. For example, when the flash 56 is used to image paper, often the paper has a glossy enough surface to produce glare that obliterates text. Magazines in particular have a very large amount of glare. The polarizer assembly 140 when installed on the image input device 26 can improve performance in reading documents with a glossy finish. While the reader machine 10 may continue to function normally without the polarizer assembly 140, the reading quality may be sacrificed, especially for glossy documents. While a user can tilt the camera at a slight angle from the text, to reduce the effects of glare, however this tilt would tend to also diminish the effectiveness of recognition processing, thus making it desirable to use the polarizer assembly 140.

The polarizer assembly 140 includes a frame 142 comprised of a stiff material to hold polarizer elements in place. The polarizer elements are comprised of sheets of polarizer film. Polarizer element 144 is oriented in vertical direction for the flash 56, whereas the other polarizer 146 is oriented in a horizontal direction for the lens 58. It is to be understood that the sheet of polarizer film is relatively thin e.g., in a range of, e.g., 0.006" to 0.03" with 0.01" being a typical thickness, other thicknesses possible. A center member 141 separates the elements 144, 146 and provides additional rigidity and strength to the polarizer assembly 140.

The polarizer film elements 144, 146 can be a linear polarizing Polyvinyl Alcohol-Iodine filter that polarizes in the visible light spectrum. The visible light transmission is 42% with an extinction transmittance of 1.7%. Optical density is measured using a beam of 100% linearly polarized light. Polarizers are available in 19"×50"×0.010" sheets obtained from American Polarizers, Inc. 141 South Seventh Street Reading, Pa. 19602 USA (as mentioned above).

Referring now to FIG. 11C, the polarizer assembly 140 is placed on top of the image input device 26 and aligned, as shown, such that one polarizer is over the flash and the other is over the lens with the mutually orthogonal orientations as shown. Many arrangements to secure the polarizer assembly 140 on the image input device 26 are possible. Because the polarizer elements 144, 146 in the polarizer assembly 140 are oriented perpendicular to each other, the ideal amount of glare is reduced from the image captured by the image input device. The polarizer assembly 140 can be permanently attached to the camera 26 or to a camera case or pouch (described below). The permanent attachment can be made with glue (not shown) or other techniques. Alternatively, rather than permanently attaching the assembly 140, the assembly 140 can be removable, because not all photographic conditions would benefit from the use of the polarizer assembly. For example, in a dark room, with a non-glossy surface it may be best to take a picture with no polarizer elements. Other ways can be used to removably attach polarizer elements to the image input device 26.

Referring now to FIGS. 12A-12C, the polarizer assembly 140 can be configured as a slider mechanism 160 that allows the polarizer elements 144, 146 to be moved over and away from the lens 58 and flash 56. The slider 160 mechanism, as shown, has an upper channel 162 and a lower channel 164. Each channel 162, 164 has a groove 163, 165 (FIG. 12B) that holds the polarizer assembly 140, allowing the polarizer assembly 140 to slide over the flash and lens (as shown in FIG. 12A) or to slide the polarizers out of the way of the flash 56 and lens 58, over to another part of the image input device (FIG. 12C).

In FIG. 12B the slider mechanism is shown as attached to the image input device. The slider mechanism 160 and its attached polarizer assembly 140 could instead be attached to a camera pouch or a camera attachment of some kind.

Figure 13A:
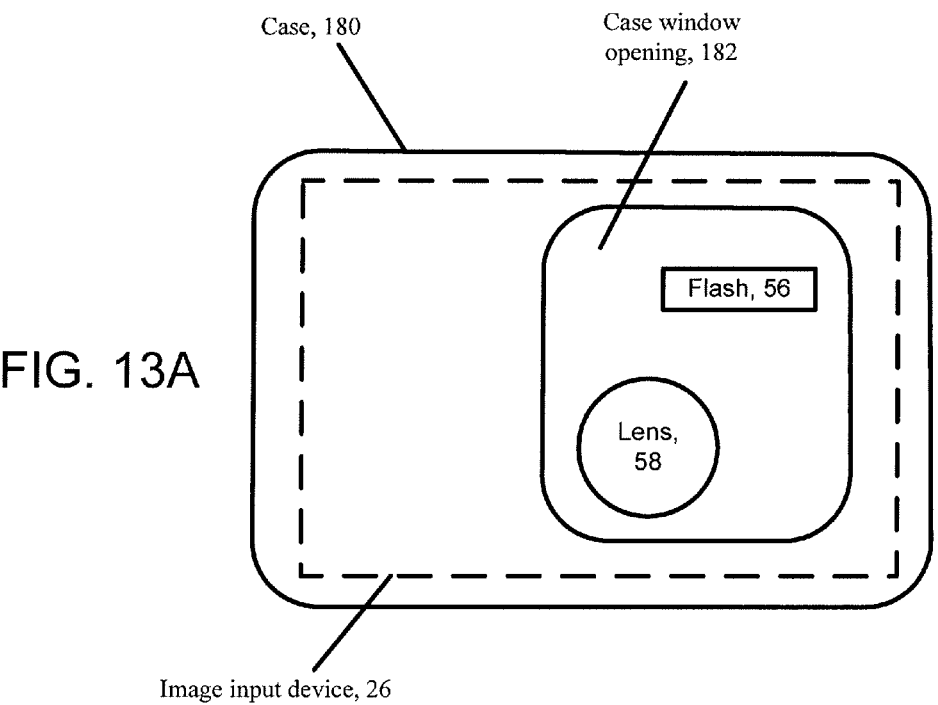
FIGS. 13A-13B are diagrams depicting a case with polarizers for an image input device.
Figure 13B:
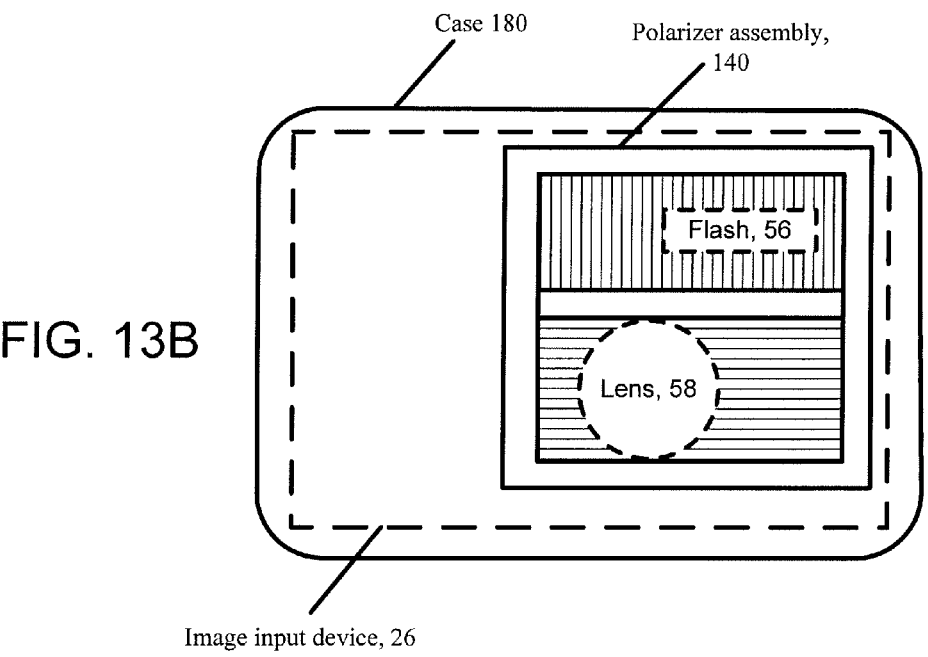

Referring now to FIGS. 13A, 13B, a pouch or case 180 used to, e.g., protect the device (e.g., camera, camera-phone, and so forth) can be configured to house the polarizer assembly 140. A soft fabric case is shown in FIG. 13A. The case is comprised of a soft fabric or other material, e.g., leather or alternatively a hard material within which is disposed a window or opening 182 in the case 180 that allows the lens 58 and flash 56 of the image input device 26 to be exposed for picture-taking. The polarizer assembly 140 is attached to the case as shown in FIG. 13B. The polarizer assembly 140 can be permanently attached with glue (not shown) to the case. Then when it is desired to take a picture without the polarizers, the image input device 26, e.g., camera can be removed from the case 80. The polarizer assembly 140 is shown attached to the outside of the case in FIGS. 13A, 13B. Attaching the assembly 140 to the inside of the case 180 is an alternative which can help protect the polarizers from being scratched.

Figure 14:
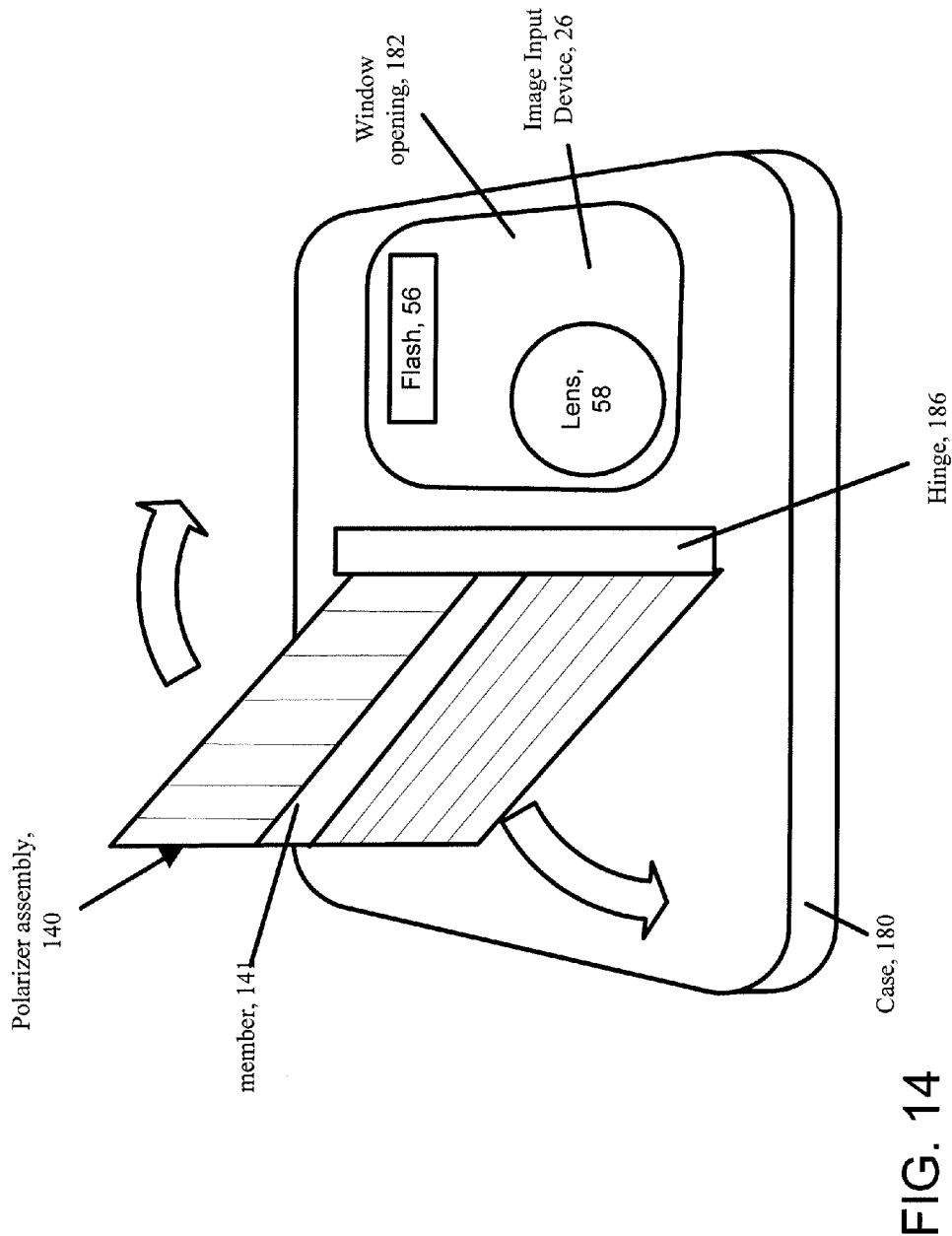
FIG. 14 is a perspective view of a hinged polarizer assembly.
Figure 15:
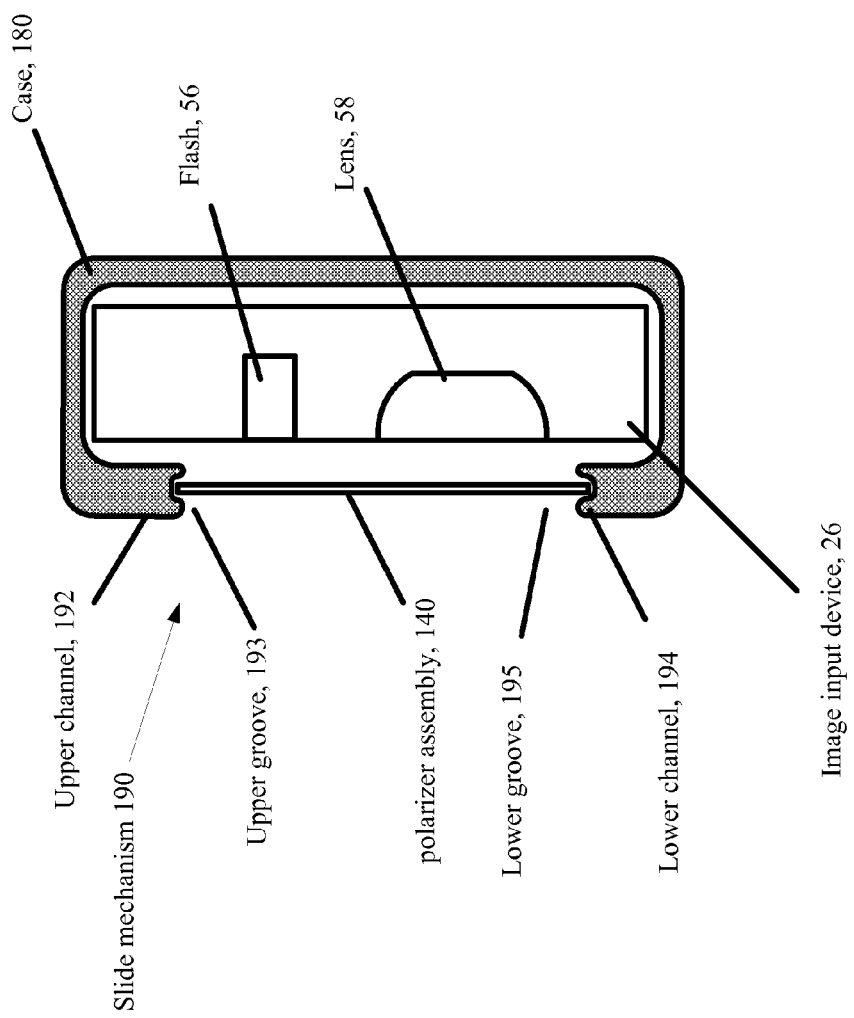
FIG. 15 is a cross-sectional view of a case.

Referring now to FIGS. 14 and 15, the polarizer assembly 140 can also be permanently attached to the case with a hinge 186 (FIG. 14) or a slider mechanism 190 (FIG. 15) or any number of other mechanisms.

In FIG. 14, the hinge 86 is used to move the polarizer assemble 140 over, and away from, the lens and flash portions of the camera. The hinge 186 bends to allow the polarizer assembly 140 to cover the window opening and the lens and flash or to be bent back to expose the window opening. The hinge 186 is part of or is attached to the case 180 and the case 180 has a window portion 182 that is covered by the polarizer assembly 140, when the polarizer is swung in place over the flash and lens. The polarizer assembly 140 and hinge 86 are shown attached to the outside of the case 180 in FIG. 14. In FIG. 14, the hinged polarizer mechanism is shown midway between covering the lens/flash and being fully open.

Referring to FIG. 15, the polarizer assembly 140 is attached to the case 180 by a slide mechanism 190. FIG. 15 the soft fabric case 80 surrounds the image input device 26. The case 180 has an accommodation for accepting the polarizer assembly 140, placing the polarizer assembly 140 over the lens and flash. The accommodation in case of FIG. 15 can be for instance, a slider mechanism 190 allowing the polarizer assembly 140 to slide over the lens and flash or to slide out of the way of the lens and flash similar to the slider mechanism described above.

The slider 190 mechanism, as shown, has an upper channel 192 and a lower channel 194. Each channel 192, 194 has a groove 193, 195 that holds the polarizer assembly 140, allowing the polarizer assembly 140 to slide over the flash and lens or to slide the polarizers out of the way of the flash 56 and lens 58, over to another part of the image input device.

Referring now to FIGS. 16A, 16B, polarizer assembly 140 can be configured as an attachment member 200 that can clip or slide onto the image input device 26. In one configuration the attachment member 200 has a generally C-shaped cross-section that conforms to the outer dimensions and features of a pair of opposing sides of the housing of the image input device 26. Opposing edges of the attachment member, have lip portions 201a, 201b that are configured to protrude over opposing edges of the image input device housing 26a to secure the attachment member to the input device housing 26a. The polarizer assembly 140 can be integral with the attachment member 200, as shown, or dropped into or otherwise secured to the attachment member 200. The attachment member 200 is comprised of, for example, a hard, but flexible plastic material. The attachment member 200 is configured to conform to the shape and features of the particular device housing 26a such that the attachment member 200 carrying the polarizer assembly 140 reliably snaps onto the device or reliably slides over the lens/flash of the device housing 26a.

The polarizer assembly 140 attachment can be secured to a cord 203 so that when polarizer assembly 140 is unsnapped from or slid off of the device, the polarizer assembly 140 is still connected to the device to prevent it from getting lost.

As an aid to assist users in applying the polarizer assembly 140 to an image input device, the polarizer assembly 140 can be keyed; such that the polarizer assembly 140 can be slid on or attached in only one configuration.

Another arrangement (not shown) has the image input device 26 with a groove or indentation around its edge to accommodate the lips 201a and 201b, (of the attachment member 200 FIG. 16B) so that the attachment member 200 can clip onto the device 26. Similarly, the device 26 may have a ridge or bump or any kind of extruding shape which can accommodate an attachment member 200 with the matching groove to fit the ridge, bump or in general the extruding shape. Therefore, other mechanical attachment mechanisms can be used.

Other accommodations on the frame are possible, such as a protrusion, e.g., a lip, a bump, a knob, and so forth. Additionally, the accommodation can be indentation such as a groove, hole, slot, with a corresponding accommodation on the image input device or case). For example, the polarizer assembly can be removably attached to a metal camera with magnets, if the outside frame and camera are made of magnetized material. Other arrangements include Velcro® strips, snaps and so forth.

In addition, the polarizer assembly 140 can be provided with a tacky surface on the frame that can attach onto the image input device 26, as needed and removed. After removal a protective sheet of e.g., plastic can cover the tacky surfaces and eventually, when the tackiness has worn-out, the polarizer assembly 140 can be replaced. This is especially useful in retrofit applications.

A number of embodiments of the invention have been described. Nevertheless, it will be understood that various modifications may be made without departing from the spirit and scope of the invention.

For example, the polarizer is shown as a film having an adhesive surface. Alternatively, the polarizer can be built into the image input device or can be affixed to the lens and flash of the image input device via other mechanisms such as by use of a frame that hold the polarize and attaches to the lens and/or flash using a threaded, a bayonet or other mechanical affixation. In addition, other keying mechanisms could be used.

Another alternative arrangement is that the delicate and thin polarizers could be transparently bonded to a more durable transparent material, such as glass or clear plastic. The rigid frame would not be necessary for the purpose of keeping the polarizers from bending.

Accordingly, other embodiments are within the scope of the following claims.

What is claimed is:

1. A device comprising:
   an image capture device, comprising:
      a housing;
      a lens mounted in said housing, and
      a flash window mounted in said housing; and
      a polarizer assembly configured to be mounted on said housing, said polarizer assembly, comprising:
         a frame member; and
         a pair of polarizers arranged in the frame member at orthogonal polarizations, with one of the pair of polarizers positioned in the frame to cover the lens and having a linear polarization that is orthogonal to a linear polarization of the other polarizer of the pair that is positioned in the frame to cover the flash window;
   a computing device coupled to the image capture device, the computing device, comprising:
      a processor to execute instructions; and
      a computer program product residing on a computer readable medium, the computer program product comprising instructions for causing the processor to:
         process images captured by the image capture device to:
         recognize features in the captured images.

2. The device of claim 1 wherein the image capture device is a camera.

3. The device of claim 1 wherein the computer program product further comprises instructions to:
   recognize text in the captured images and produce text; and
   convert the recognized text to speech using text-to-speech software.

4. The device of claim 1 wherein the frame member of the polarizer assembly is comprised of a material that is stiffer than the material of the polarizers, with one of the polarizers disposed in a first portion of the frame that is aligned to the lens and the other one of the polarizers disposed in a second portion of the frame that is aligned with the flash window of the image input device.

5. The device of claim 1, further comprising:
   a pair of opposing channel members that are disposed on a face of the housing of said image capture device, the pair of opposing channel members configured to accept the frame member.

6. The device of claim 5 wherein the pair of opposing channel members each has a groove that accepts one of a pair of opposing edges of the frame member.

7. The device of claim 5 wherein the pair of opposing channel members are each arranged and configured to allow the frame member to be disposed over the flash and lens of the image capture device in a first orientation and to be retracted from image capture device in a second, different orientation.

8. The device of claim 1 further comprising:
   a case enclosing the device, the case having a window portion, with the case accepting the polarizer assembly in the window portion of the case.

9. The device of claim 8 wherein the case has pair of opposing grooves adjacent the window portion to accept a pair of opposing edges of the polarizer assembly.

10. The device of claim 8 wherein the case has a hinged member affixed to a face of said case, with the polarizer assembly affixed to the hinge member to permit the polarizer assembly to be moved over and away from the flash and lens of the image input device.

11. The device of claim 8 wherein the case has a hinged member affixed to a face of said case, with the polarizer assembly being an integral part of the hinge member to permit the polarizer assembly to be moved over and away from the flash and lens of the image input device.

12. The device of claim 1 wherein the frame of the polarizer assembly, has four sides and center member spaced from two of the four sides and together with the four sides forming two spaced apertures in the frame.

13. The device of claim 12 wherein the pair of polarizer elements secured by the frame, with one of the polarizer elements secured within a first one of the two apertures and having a linear polarization that is orthogonal to a linear polarization of the other of the polarizer elements that is secured within a second one of the two apertures.

14. A case for a cell phone having an image capture device, the case comprising:
- a body portion configured to house a cell phone having an image capture device, the body portion having a window; and
- an accommodation for accepting in the window a polarizer assembly, said case further comprising said polarizer assembly affixed to the window of the case, the polarizer assembly, comprising:
- a frame member; and
- a pair of polarizers arranged in the frame member at orthogonal polarizations, the case and polarizer assembly configured to have one of the pair of polarizers covering a lens having a linear polarization that is orthogonal to a linear polarization of the other polarizer of the pair that covers a flash of the image capture device.

* * * * *